United States Patent

[11] 3,540,762

[72] Inventor Jerald V. Dunlap
P.O. Box 1541, Santa Monica, California 90406
[21] Appl. No. 753,299
[22] Filed Aug. 16, 1968
[45] Patented Nov. 17, 1970

[54] SEGMENTED THREAD COUPLING
5 Claims, 6 Drawing Figs.
[52] U.S. Cl..................................................... 285/391,
85/1; 287/125
[51] Int. Cl....................................................... F16l 15/00
[50] Field of Search............................................ 285/391,
355, 332.4, 333, 334; 85/1 Inquired, 32 Inquired;
287/62, 117, 125

[56] References Cited
UNITED STATES PATENTS
1,311,145 7/1919 Zeindler et al................ 285/391X
1,539,287 5/1925 Wilson .......................... 285/391X
1,605,314 11/1926 Wilson .......................... 285/391
1,605,315 11/1926 Wilson .......................... 285/391X
3,344,787 10/1967 Maclean........................ 85/32(INT.)

Primary Examiner—Reinaldo P. Machado
Assistant Examiner—Wayne L. Shedd
Attorney—Pastoriza, & Kelly ABSTRACT: Quick connect and disconnect threaded couplings for fire hoses are provided with segmented thread means for enabling connection and disconnection to take place with less than one full turn of the coupling. The coupling includes a first member having a cylindrical exterior forward portion with circumferentially spaced external thread segment means defining external sectors free of threads, and, a second member having a cylindrical interior surface portion with circumferentially spaced internal thread segment means defining internal sectors free of threads. Cooperating thread abutting means are provided on the members such that insertion of the forward portion of the one member into the interior surface portion of the other can take place with any one of the external thread segment means being received in any one of the internal sectors with complete assurance that the external and internal thread segment means will be in proper axial alignment and positions relative to each other for threading together upon rotation of one member relative to the other.

Patented Nov. 17, 1970 3,540,762

INVENTOR:
JERALD V. DUNLAP
BY
Elliott & Pastoriza
ATTORNEYS 3,540,762

1

SEGMENTED THREAD COUPLING

This invention relates generally to segmented type thread couplings for connecting or disconnecting lengths of flexible conduits such as fire hoses.

BACKGROUND OF THE INVENTION

In fighting fires, it is necessary to effect very rapid connections and disconnections between lengths of fire hose as well as to hydrants or other sources of water supply. Normally such couplings for the various lengths of hose takes the form of a threaded male member and a swivelly-formed threaded female portion on the opposed ends of the hose to be connected or disconnected. In the case of a major fire, several different fire departments may participate and in this respect, it is not uncommon to couple hose sections of one fire department with those of another.

To assure that all types of equipment from various different fire departments throughout the entire country will be compatible, there has been established the National Fire Protection Association Standard for Fire Hose Coupling Screw Threads. These standards, at present, require a single lead screw thread of a given pitch and a given number of turns for various classes of hose determined by the hose diameter. As a consequence of this standard, fire hose couplings are compatible among various different fire departments. There is still involved, however, a considerable waste in time in actually effecting various connections and disconnections of the hose lengths.

In an effort to solve the foregoing problem, different types of "quick-connect" and "quick-disconnect" couplings have been proposed. Certain types of these couplings principally manufactured in foreign countries involve simple bayonet type hook and slots so that less than a full turn is necessary to effect a desired coupling. These devices however are totally incompatible with present fire fighting equipment and the standards set forth by the National Fire Protection Association and therefore, from the standpoint of practicality, are unusable in this country. Other types of proposed prior art couplings for enabling very rapid connection and disconnection of fire hoses contemplates the use of segmented threads; that is, thread segments extending only partially circumferentially about the coupling are provided to leave sectors free of threads. With this arrangement, the members may be axially positioned together with the thread segments of one member being received within the sectors free of threads in the other member and thereafter only a partial turn is necessary to tighten the threads together.

Three major problems have arisen with such types of segmented thread couplings. First, when utilizing thread segments circumferentially separated by sectors free of threads, the manner in which the couplings may initially be axially moved together with certain thread segments received in certain sectors free of threads is ambiguous and there is no assurance that proper threading can be completed for all possible positions of thread segments in the sectors free of threads. In other words, in several of the possible positions, the coupling members will tend to "cock" or tilt relative to each other resulting in cross threading. Second, there has been lacking any assurance that even when properly positioned for threading, rotation of the members will be checked or stopped when the threads are completely engaged. Without a suitable stop means, the threaded segments may be only partially threaded or extend past into free sectors to a partial extent thus impairing the integrity of the coupling. Third, the segmented thread couplings available have not always met the standards set by the National Fire Protection Association and thus are not compatible with present equipment or those from different fire departments.

BRIEF SUMMARY OF THE PRESENT INVENTION

With the foregoing considerations in mind, the present invention comprises an improved segmented thread type of coupling for fire hoses wherein the problems heretofore referred to with respect to prior art type segmented thread couplings are overcome.

More particularly, the coupling of the present invention comprises a first member including a cylindrical exterior forward portion having a circumferentially-spaced external thread segment means defining external sectors free of threads, and a second member including a cylindrical interior surface portion for receiving the forward portion of the first member and having circumferentially-spaced internal thread segments defining internal sectors free of threads. Cooperating thread abutting means are provided and positioned such that insertion of the forward portion into the interior surface portion can take place with any one of the external thread segment means being received in any one of the internal sectors with the external and internal thread segment means in proper axial alignment and positions relative to each other for threading together upon rotation of one member relative to the other.

The thread segment means on the members are each defined by a single lead thread with circumferentially-spaced sectors free of threads to leave circumferentially-spaced thread segment means. The position of the single lead thread of proper pitch meets the requirement of the National Fire Protection Association. Further, the novel thread abutting means is so designed as to avoid the risk of cross threading regardless of which thread segment means are received in which sectors so that the couplings may be assembled in any of the possible positions without fear of jamming or cross threading. Finally, there is included stop means in the second member in a position to block relative rotation of the members when the external thread segment means have respectively been completely threaded to the internal thread segment means and the initial and terminal points of the external and internal sectors are aligned. The integrity of the connection is thus assured and in all instances, the couplings can be effected with less than a full turn of one member relative to the other.

BRIEF DESCRIPTION OF THE DRAWINGS

A better understanding of the present invention will be had by referring to a preferred embodiment thereof as illustrated in the accompanying drawings, in which.

DETAILED DESCRIPTION OF THE PREFERRED EMBODIMENT

Figure 1:
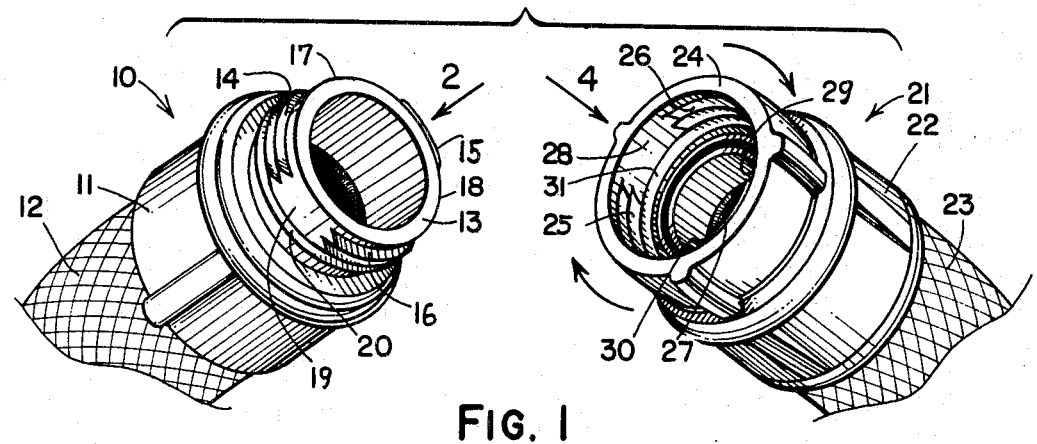
FIG. 1 is a fragmentary perspective view illustrating first and second coupling members prior to threaded engagement with each other designed in accord with the present invention.

Referring first to FIG. 1 there is shown a first coupling member 10 including a tailpiece portion 11 connected to one end of a length of fire hose 12. This member includes a cylindrical exterior forward portion 13 having a single lead external thread only on the forward portion with circumferentially-spaced external sectors free of threads to leave circumferentially-spaced external thread segment means indicated at 14, 15, and 16. The sector portions free of threads are indicated at 17, 18, and 19 and in this preferred embodiment there are provided three such sectors equally circumferentially-spaced and subtending substantially equal angles.

A first thread abutting means is provided in the form of a continuation of the rearward most external thread of one of the external thread segment means as indicated at 20 such that a thread abutment is provided in at least one of the sectors in helical alignment with the external thread.

Referring now to the second coupling member illustrated in FIG. 1, this coupling is indicated generally by the numeral 21 and includes a tailpiece portion 22 connected to the end of a hose length 23. A swivel mounting 24 is coupled to the tailpiece 22 and has a cylindrical interior surface portion for receiving the forward portion of the first member 10. This interior surface portion includes a single lead internal thread with circumferentially-spaced internal sectors free of threads to leave circumferentially-spaced internal thread segment means 25, 26, and 27. The internal sectors are indicated at 28, 29, and 30 and are three in number and equally circumferentially-spaced and subtend equal angles.

A second thread abutting means takes the form of a continuation of the rearward most internal thread as indicated at 31 to define an abutting means in at least one of the sectors which is helically aligned with the internal thread.

The circumferential extent or angle subtended by the external thread segment means and internal thread segment means corresponds substantially to the angle subtended by the sectors or portion free of threads so that the forward portion 13 of the coupling 10 may be received within the swivel 24 of the coupling 21 with any one of the external thread segment means 14, 15, or 16 receivable in any one of the internal sectors 28, 29, or 30. The respective thread abutting means in the form of the rearwardly disposed continuous threads 20 and 31 respectively for the members 10 and 21 are such that regardless of which external thread segment means is received in which internal sector, abutment of the forwardmost threads on internal and external thread segment means with the thread abutting means occurs on both sides of all diameters through the axis of the members when the same are assembled together. As a consequence, the respective external and internal thread segment means are in proper axial alignment and positions relative to each other for threading together upon rotation of one member relative to the other.

In one of the possible three positions, only a one-sixth turn is necessary to effect complete threading. In a second possible position, a half turn is necessary, and in the third possible position five-sixths of a turn is required. In every instance, however, less than one complete turn is necessary to assure proper threaded engagement between the couplings.

The foregoing arrangement as well as further features and advantages of the coupling of this invention will be better understood by now referring to FIGS. 2 through 6.

Figure 2:
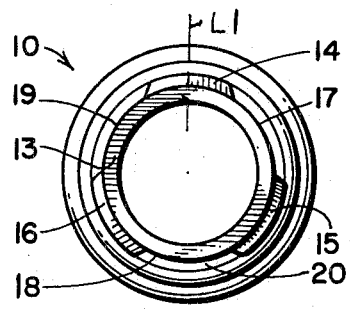
FIG. 2 is a front elevational view of one of the members of FIG. 1 looking in the direction of the arrow 2.

Referring first to FIG. 2 wherein the end of the first coupling member 10 of FIG. 1 is shown in plan, the substantially equal circumferential spacing and extent of the external thread segments 14, 15 and 16 relative to the external sectors 17, 18, and 19 is clear. Further, it will be noted that the first thread abutment means in the form of the continuous rearward thread 20 extends into all of the three sectors 17, 18, and 19, although such is not essential to the invention.

Figure 3:
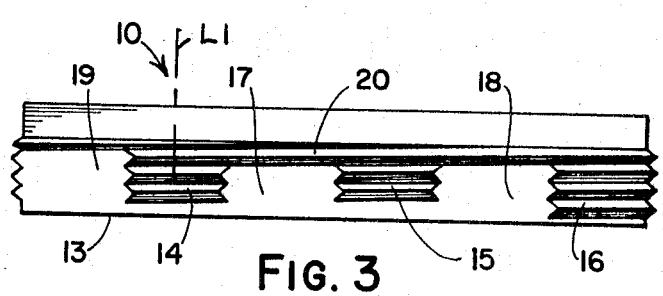
FIG. 3 is a flat layout of the external thread segment means for the member illustrated in FIG. 2.

In the layout of the external thread segment means as illustrated in FIG. 3, it will be noted that the thread abutment means in the form of the continuous thread 20 initiates as a continuation of the rearward most thread of the thread segment means 14. This thread segment means has a forward most thread which is in the second forward most axial position of the forward most threads of the remaining two external thread segment means 16 and 15.

Figure 4:
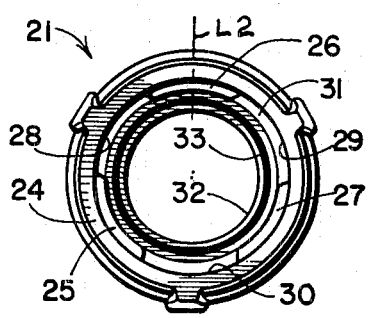
FIG. 4 is an end elevational view of the other of the members of FIG. 1 looking in the direction of the arrow 4.

Referring now to FIG. 4 the corresponding circumferential extent of the internal thread segment means 25, 26, and 27 relative to the internal sectors 28, 29, and 30 will be evident. As in the case of the first thread abutment means 20 for the coupling 10 of FIGS. 2 and 3, the second thread abutment means for the member 21 extends over a complete turn to pass through the three internal sectors as indicated at 31.

It will be also noted in FIG. 4 that the second coupling member 21 includes an internal ring 32 surrounded by a sealing gasket 33. The ring 32 has its forward surface slightly below the annular seal 33 such that when the front surface of the forward portion 13 of the member 10 of FIG. 2 abuts gasket 33 some compression will take place before this forward end seats on the ring 32. The axial position of the ring 32 relative to the forward end of the forward portion 13 of the member 10 is such that full surface engagement will take place only when the external thread segment means 14, 15, and 16 of FIG. 3 are fully threaded with the internal thread segment means 26, 27, and 25 respectively with the initial and terminal points of the external and internal sectors aligned. The ring 32 thus functions as a stop means as will become more fully apparent when the operation of the overall coupling is described.

Figure 5:
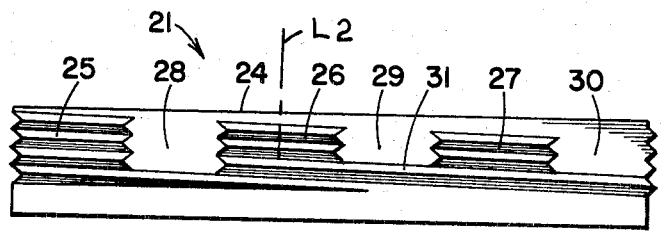
FIG. 5 is a flat layout of the internal thread segment means of the member of FIG. 4.

In FIG. 5, it will be noted that the second thread abutment means in the form of a continuous thread 31 initiates at that internal thread segment means 26 having a forward most thread which is in the second forward most axial position of the forward most threads of the remaining internal thread segment means 25 and 27.

The number of thread segments in each external thread segment means 14, 15, and 16 of FIG. 3 is equal respectively to the number of thread segments in each internal thread segment means 26, 27, and 25 of FIG. 5.

Figure 6:
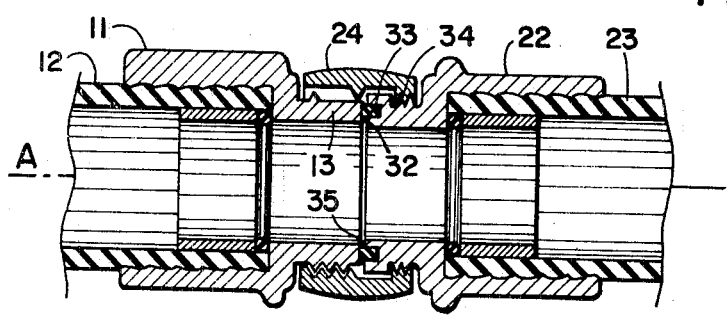
FIG. 6 is a cross section of the members illustrated in FIG. 1 in coupled relationship.

Referring now to the assembled view of FIG. 6, the manner in which the gasket 33 surrounds the stop ring 32 and protrudes slightly forward thereof to effect a sealing engagement against the forward end of the forward portion 13 will be clear. It will also be noted that the tailpiece 22 includes a pair of zero pitch threads 34 for engagement with corresponding threads on the swivel 24 such that rotation of the swivel 24 can take place relative to the tailpiece 22 without any axial movement thereof.

OPERATION

The operation of the segmented thread coupling will be evident from the foregoing description of FIGS. 1 through 6.

As mentioned, a unique and novel feature of this segmented thread coupling is the fact that the members may be coupled together without risk of cocking or cross threading regardless of the initial positioning of the external thread segment means in the internal sectors. For example, viewing the thread layout illustrations of FIGS. 3 and 5 together, visualize the right end of threads 16 in FIG. 3 as curved downwardly into the plane of the drawing and upwardly to terminate at the left to present a convex view of the sectors 19, 17, and 18. In FIG. 5, visualize the right end of the sector 30 as curved upwardly out of the plane of the drawing and downwardly to terminate to the left to present a concave view of the sectors 28, 29, and 30.

Next, if the member 10 is now viewed from the bottom and rotated clockwise one-fifth of a turn, the threads will be positioned as shown in FIG. 2, the reference lines L1 denoting the center of threads 14. If the member 21 of FIG. 5 is viewed from above, it will appear as in FIG. 4, the reference lines L2 denoting the center of threads 26.

In these positions, if the members 10 and 21 are brought axially together, the thread segment means 14, 15, and 16 will be respectively received in sectors 30, 29, and 28. The forward most threads of the external thread segment means 14, 15, and 16 will all abut against the second thread abutment means in the form of a continuous thread 31 and because of the helical alignment of this continuous thread 31 with the thread segment means, it will be clear that axial alignment will be maintained.

In addition, when the member of FIG. 3 is brought down into engagement with the member of FIG. 5, the forwardmost threads on the respective internal thread segment means 25, 26, and 27 will pass within the external sectors 19, 18, and 17 respectively and will abut against the first thread abutment means in the form of the continuous external thread 20. Again because of the helical alignment of this continuous thread 20 with the thread of the external thread segment means, the members will still be in axial alignment.

In the foregoing position as described, only a one-sixth turn is necessary to bring the respective thread segment means into complete threaded engagement at which time the forward end of the forward portion 13 will abut against the stop ring 32 described in FIG. 6 after effecting a proper seal on the annular sealing gasket 33. It will be understood, of course, that the one-sixth turn necessary is a relative threading such that the same is actually effected by rotating the swivel 24 of FIG. 6 one-sixth of a turn.

Uncoupling of the two members is quickly accomplished by simply rotating the swivel 24 in an opposite direction for one-sixth of a turn and then moving the members axially apart.

Assume now that the first and second members are positioned together such that the external thread segment means 14 is received in the internal sector 29 (with reference again to FIGS. 2 and 4). In this case, the external thread segment means 15 will be received in the internal sector 28 and the external thread segment means 16 will be received in the internal sector 30. Thread abutment will take place between the forwardmost thread on the external thread segment means 14 and the continuous thread 31 in the internal sector 29. Simultaneously, thread abutment will take place between the forwardmost thread of the internal thread segment means 25 and the continuous thread 20 in the sector 18. It will now require a relative rotation of three-sixths (one-half) of a turn to effect complete threaded engagement since in the axial position described, the members are axially intermediate their closest and furthest positions.

The third possible position would result when the external thread segment means 14 are received in the internal sector 28, the external thread segment means 15 received in the internal sector 30, and the external thread segment means 16 received in the internal sector 29. In this case the forwardmost thread on the external thread segment means 16 will abut against the continuous thread 31 in the internal sector 29, while the forwardmost thread on the internal thread segment means 25 will abut against the continuous thread 20 in the sector 17. Again the members will be in axial alignment but in this case five-sixths of a relative rotation must take place to effect complete threading.

It will be understood from the foregoing that because of the fact that the first and second thread abutting means constitute rearward helical continuations of the rearwardmost external and internal threads of given ones of the external and internal thread segment means, abutment of the forwardmost threads on internal and external thread segment means occurs on both sides of all diameters through the axis of the members regardless of the three possible manners of insertion of the forward portion of the first member into the second member. Therefore, cocking or tilting of one member relative to the other which could result in cross threading is wholly avoided.

From the foregoing description, it will be evident that the present invention has provided a greatly improved segmented type thread coupling wherein the deficiencies characterizing certain prior art segmented type couplings have been completely overcome. It should be understood that in addition to the features minimizing risk of cross threading as described, the single lead thread from which the thread segment means are formed complies with the standard set forth by the National Fire Protection Association so that the present couplings are fully compatible with conventional screw couplings presently in operation.

I claim:
1. A coupling comprising:
   a. a first member having a cylindrical exterior forward portion,
      1. said forward portion having external thread means consisting solely of a single lead external thread with circumferentially-spaced external sectors free of threads to leave circumferentially-spaced external thread segment means; and
      2. first thread abutting means in the rearward portion of at least one of said external sectors constituting effectively a helically rearward continuation of the rearward most external thread of a given one of said external thread segment means;
   b. a second member having a cylindrical interior surface portion for receiving said forward portion of said first member.
      1. said interior surface portion having internal thread means consisting solely of a single lead internal thread with circumferentially-spaced internal sectors free of threads to leave circumferentially-spaced internal thread segment means; and,
      2. second thread abutting means in the rearward portion of at least one of said internal sectors constituting effectively a helically rearward continuation of the rearwardmost internal thread of a given one of said internal thread segment means, whereby insertion of said forward portion into said interior surface portion can take place with any one of said external thread segment means being received in any one of said internal sectors, the forward most threads on internal and external thread segment means abutting said first and second thread abutting means respectively on both sides of all diameters through the axis of said members to prevent axial angular misalignment of the members and thereby positioning the internal and external thread segment means in proper axial alignment in every engageable position relative to each other for threading together upon rotation of one member relative to the other.

2. The subject matter of claim 1, in which said external and internal circumferentially-spaced sectors are each three in number and are substantially equally circumferentially-spaced and define substantially equal subtended angles, respectively on said first and second members, the circumferential extent of said external and internal thread segment means corresponding substantially to the circumferential extent of said sectors.

3. The subject matter of claim 1, in which the number of thread segments in each of said external thread segment means is equal respectively to the number of thread segments in each of said internal thread segment means.

4. The subject matter of claim 1, in which said external and internal circumferentially-spaced sectors are substantially equally circumferentially spaced and define substantially equal subtended angles, respectively on said first and second members, the circumferential extent of said external and internal thread segment means corresponding substantially to the circumferential extent of said sectors; and in which said given one of said external thread segment means is that thread segment means whose forwardmost thread is the second forwardmost thread of the external thread segment means, said given one of said internal thread segment means being that thread segment means whose forwardmost thread is the second forwardmost thread of the internal thread segment means.

5. The subject matter of claim 1, including stop means in said second member positioned rearwardly of said second thread abutting means in a position to block further relative rotation of said members when said external thread segment means have respectively been completely threaded to said internal thread segment means and the initial and terminal points of said external and internal sectors are aligned.